United States Patent
Lee

(10) Patent No.: US 6,517,302 B2
(45) Date of Patent: Feb. 11, 2003

(54) MODULAR CLIP

(75) Inventor: Ho Dal Lee, Pusan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/728,077

(22) Filed: Dec. 4, 2000

(65) Prior Publication Data

US 2001/0005925 A1 Jul. 5, 2001

(30) Foreign Application Priority Data

Dec. 30, 1999 (KR) .............................. 99-67213

(51) Int. Cl.⁷ ................................................ F16B 37/04
(52) U.S. Cl. ........................ 411/182; 411/508; 411/913
(58) Field of Search ................................ 411/182, 508, 411/509, 510, 913

(56) References Cited

U.S. PATENT DOCUMENTS 4,606,688 A * 8/1986 Moran et al. ............ 411/182 X
5,694,719 A * 12/1997 Bejune et al. ........... 411/182 X
5,919,019 A * 7/1999 Fischer ........................ 411/182

FOREIGN PATENT DOCUMENTS

DE 2905801 * 8/1979 ................. 411/182

* cited by examiner

Primary Examiner—Neill Wilson
(74) Attorney, Agent, or Firm—Birch, Stewart, Kolasch & Birch LLP

(57) ABSTRACT

The present invention relates to a modular clip comprising a clip body having an internally threaded hole formed in its center and two open-ring type elastic members formed integrally with and protruded from both sides of said clip body, respectively. Each of said elastic members has a panel receiving recess formed along the entire length on opposite end portions thereof, respectively.

Said elastic members are then extruded outwardly with respect to the main body when structure members mounted to an interior of the automobile and the main body of the modular clip are joined by a screw, and subsequently a circumference of an internally threaded hole formed on the body panel is received in the panel receiving recesses of the elastic members thus easing the mounting of said modular clip to the body panel.

1 Claim, 2 Drawing Sheets

MODULAR CLIP

BACKGROUND OF THE INVENTION

1. Field of the Invention

The present invention relates to a modular clip, and more particularly, to a modular clip comprising an internally threaded hole formed in the center of its body and two open-ring elastic members protruded from both sides of said clip, the elastic portion of which is being extruded out as being pressed while joining a screw into said hole and subsequently locked into a body panel.

2. Description of the Prior Art

In general, various elements of an automobile such as a sun visor, a room lamp and an assist handle are mounted followed by the mounting of a head lining to a loop panel. The above elements are usually mounted by using a screw and finished by putting a cover or the like. For example, in case of an assist handle, a head lining is first mounted to a loop panel and then the assist handle is fixed to the head lining by using a screw. The screw is then shielded by putting a cover on its top in order to enhance the appearance.

SUMMARY OF THE INVENTION

The object of the present invention is to provide a modular clip comprising a clip body wherein an internally threaded hole is formed in the center of its body along with open-ring elastic members formed at both sides of said clip with its one end fixed to said clip body, which are formed integrally and each of said elastic members provided with a panel receiving recess is extruded out from both sides of said clip body to an opposite direction in relation to each other as a screw joining between said clip body and a body panel is being screwed, thus easily locking said elastic members into a body panel.

DETAILED DESCRIPTION OF THE INVENTION

The present invention can be better understood by explanations of the drawings as follows.

Figure 1:
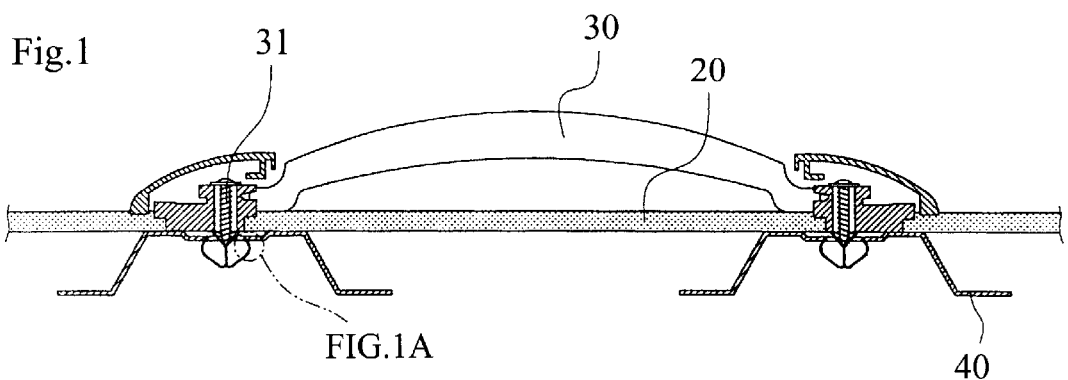
FIG. 1 is a perspective view of a modular clip according to the present invention.
Figure 1A:
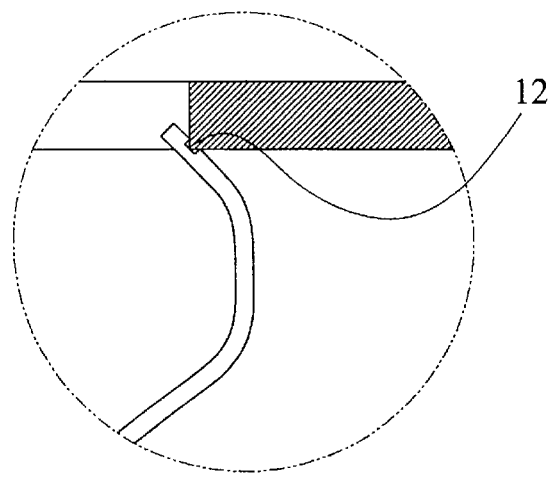

FIG. 1 is a perspective view showing a modular clip according to the present invention.

The modular clip according to the present invention comprises a main body 10 and elastic members 11 formed at both sides of said main body 10 and an aperture 13 for mounting is formed in the center of said main body 10. The elastic members 11 in an open-ring shape are integral with and extruded out from the main body 10 in an opposite direction with each other.

In each of the elastic members 11, a panel receiving recess 12 is formed along the entire length on the opposite end of said elastic member 11, respectively.

Steps for mounting an assist handle by means of the modular clip according to the present invention will be described in conjunction with FIG. 2 and FIG. 3A to FIG. 3C.

Figure 2:
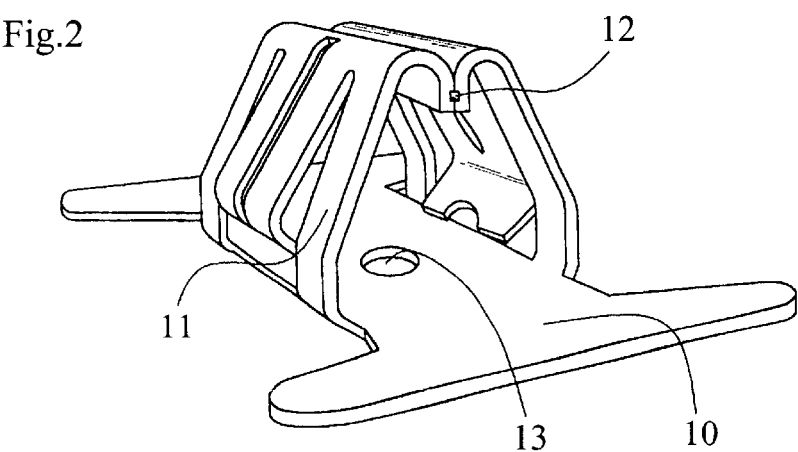
FIG. 2 is a sectional view of a modular clip mounted according to the present invention.
Figure 3A:
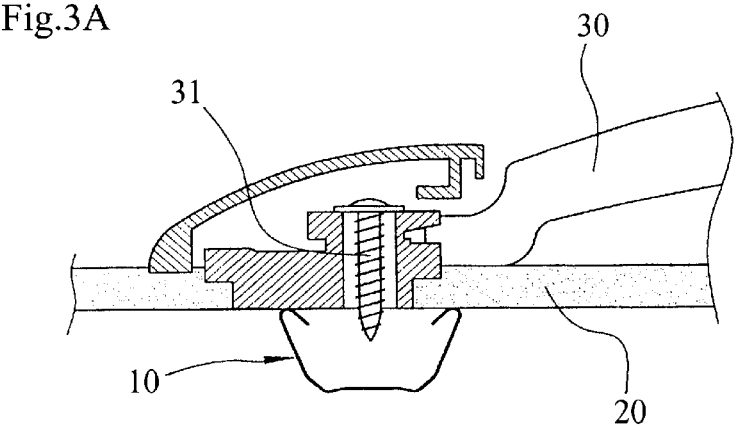
FIG. 3A to FIG. 3C are partial sectional views showing steps for locking a clip body into structural elements.
Figure 3B:
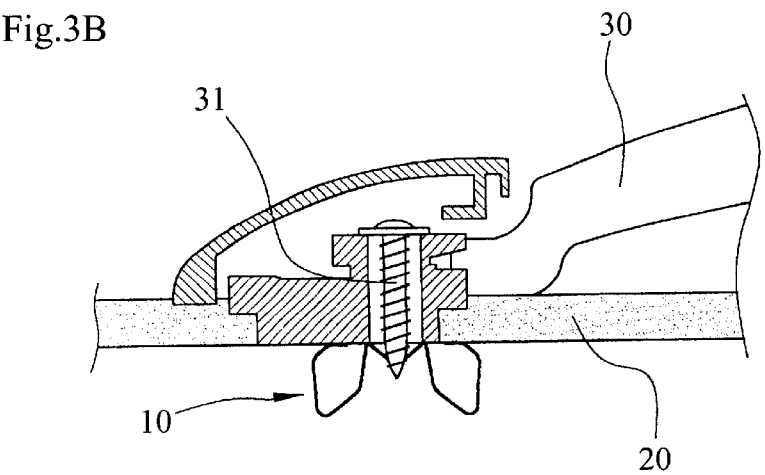
Figure 3C:
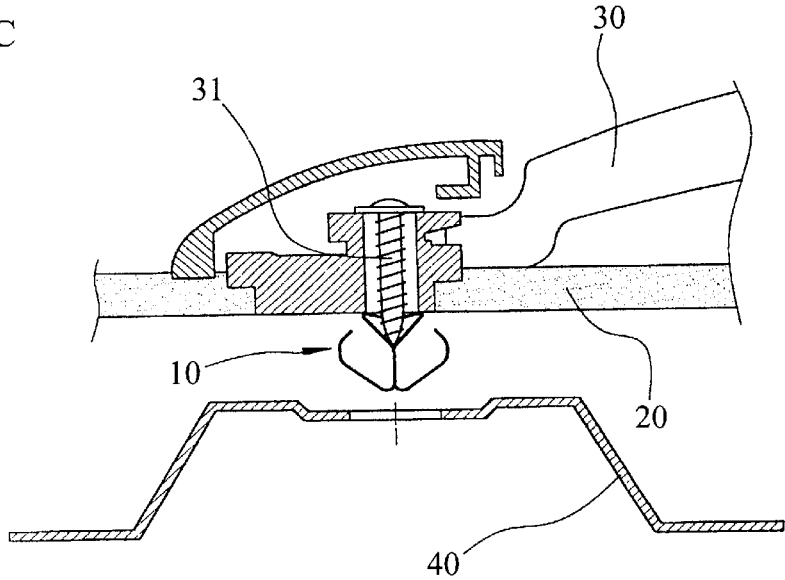

FIG. 2 is a sectional view showing a modular clip mounted according to the present invention, whereas FIG. 3A to FIG. 3C are partial sectional views showing steps for locking a clip body into structural elements.

First of all, a head lining 20 and an assist handle 30 are stacked sequentially on the main body 10, and then the assist handle 30, the head lining 20 and the clip are joined by using a screw 31 with the assist handle 30.

In the above joining step, the clip is so positioned that the elastic members 11 face upward and contact with the head lining 20(as shown in FIG. 3A). Then, the screw 31 is screwed into said holes formed on the assist handle 30 and the head lining 20, respectively, and passed through an interstitial space between two elastic members 11. The screw 31 is screwed into the aperture 13 formed on the main body 12 and as the screw is inserted further into the aperture 13 the clip becomes elevated further. Consequently, as the head lining 20 presses down on the elastic members 11, the elastic members 11 are extruded outward, respectively, with respect to the main body 13 as shown in FIG. 3B.

When the insertion of the screw 31 comes to a completion, the upper surface of the main body 10 of the clip can contact with the lower surface of the head lining 20 and the elastic members 11 become located at both sides of the main body 10 and an inner side of each elastic member 11; that is, the panel receiving recess 12 becomes facing out (as shown in FIG. 3C).

At this situation, when the main body 10 and the elastic member 11 are inserted into a mounting hole 41 of the panel 40, an end portion of each elastic member 11 facing out is being pressed down inwardly due to a circumference of the mounting hole 41 of the panel 40.

When the panel receiving recess 12 of each elastic member 11 is corresponded to the circumference of the mounting hole 41 of the panel 40, the circumference of the mounting hole 41 is received in the panel receiving recess 12 of each elastic member 11 due to an elasticity of each the elastic member 11 and the clip is mounted firmly to the panel 40.

Therefore, the assist handle 30 combined with the head lining 20 by the clip only can be mounted to the body panel 40.

As described above, the present invention provides the modular clip which has a clip body wherein an internally threaded hole is formed in the center along with open-ring elastic portions formed integrally at both sides thereof, respectively, so that structural members to be mounted to the loop panel are combined with the head lining by means of the modular clip, whereby the structural members can be mounted to the loop panel easily by the modular clip which is mountable to the body panel.

Although this invention has been described in its preferred form with a certain degree of particularity, it is appreciated by those skilled in the art that the present invention disclosure of the preferred form has been made only by way of example and that numerous changes in the details of the construction, combination and arrangement of parts may be resorted to without departing from the spirit and scope of the invention.

What is claimed is:

1. A modular clip for snap-fit with a recess in a panel comprising;
   a) a clip body having an internally threaded hole formed in the center; and
   b) two open-ring type elastic members which are protruded from both sides of said clip body and formed integrally with said clip body, said clip body and said elastic members being movable between an initial position and a final position, said clip body being disposed inside-out in said final position as compared to said initial position in order to increase holding forces of the elastic members in said final position with respect to the recess in said panel.

* * * * *